United States Patent
Zhang et al.

(10) Patent No.: US 12,427,990 B2
(45) Date of Patent: Sep. 30, 2025

(54) DRIVING CONTROL METHOD FOR VEHICLE

(71) Applicants: ZHEJIANG GEELY HOLDING GROUP CO., LTD, Zhejiang (CN); NINGBO GEELY AUTOMOBILE RESEARCH & DEVELOPMENT CO. LTD., Zhejiang (CN)

(72) Inventors: Feixiang Zhang, Zhejiang (CN); Yuan Yao, Zhejiang (CN); Hao Liu, Zhejiang (CN)

(73) Assignees: ZHEJIANG GEELY HOLDING GROUP CO., LTD., Zhejiang (CN); NINGBO GEELY AUTOMOBILE RESEARCH & DEVELOPMENT CO. LTD., Zhejiang (CN)

( * ) Notice: Subject to any disclaimer, the term of this patent is extended or adjusted under 35 U.S.C. 154(b) by 293 days.

(21) Appl. No.: 18/245,911

(22) PCT Filed: Sep. 21, 2020

(86) PCT No.: PCT/CN2020/116489
§ 371 (c)(1),
(2) Date: Mar. 20, 2023

(87) PCT Pub. No.: WO2022/056908
PCT Pub. Date: Mar. 24, 2022

(65) Prior Publication Data
US 2023/0382388 A1   Nov. 30, 2023

(51) Int. Cl.
*B60W 30/182* (2020.01)
*B60W 10/20* (2006.01)
(Continued)

(52) U.S. Cl.
CPC .......... *B60W 30/182* (2013.01); *B60W 10/20* (2013.01); *B60W 30/12* (2013.01); *B60W 50/14* (2013.01)

(58) Field of Classification Search
CPC ...... B60W 10/20; B60W 30/12; B60W 30/17; B60W 30/182; B60W 50/14
See application file for complete search history.

(56) References Cited

U.S. PATENT DOCUMENTS 5,225,983 A      7/1993  Ohmura et al.
6,615,944 B1 *   9/2003  Horwath ................ B62D 7/159
                                                       180/204
(Continued)

FOREIGN PATENT DOCUMENTS

CN    104678832 A    6/2015
CN    105163994 A    12/2015
(Continued)

OTHER PUBLICATIONS

Chinese Intellectual Property Office (ISR/CN), "International Search Report for PCT/CN2020/116489", China, Jun. 18, 2021.
(Continued)

*Primary Examiner* — Charles J Han
(74) *Attorney, Agent, or Firm* — Westbridge IP LLC

(57) ABSTRACT

Disclosed is a driving control method for a vehicle, comprising: acquiring a state of a rear wheel steering function of a vehicle; and adjusting the state of the rear wheel steering function to control a traffic jam pilot function of the vehicle to enter an activated state, wherein if the rear wheel steering function is in an activated state, before the rear wheel steering function is switched to an inactivated state, the traffic jam pilot function does not enter the activated state, and if the rear wheel steering function is in an inactivated state, after both a longitudinal control state and a lateral
(Continued)

control state of the vehicle enter a traffic jam pilot mode, the traffic jam pilot function enters the activated state.

10 Claims, 4 Drawing Sheets

(51) Int. Cl.
   *B60W 30/12* (2020.01)
   *B60W 50/14* (2020.01)

(56) References Cited

U.S. PATENT DOCUMENTS

| | | |
|---|---|---|
| 2005/0143893 A1 | 6/2005 | Takamatsu et al. |
| 2011/0190972 A1* | 8/2011 | Timmons ............... G08G 1/167 |
| | | 701/31.4 |
| 2018/0194394 A1 | 7/2018 | Stratmann et al. |
| 2020/0001856 A1 | 1/2020 | Johnson et al. |

FOREIGN PATENT DOCUMENTS

| | | |
|---|---|---|
| CN | 106218636 A | 12/2016 |
| CN | 108437988 A | 8/2018 |
| CN | 108791307 A | 11/2018 |
| CN | 109903576 A | 6/2019 |
| CN | 110341709 A | 10/2019 |
| CN | 110515379 A | 11/2019 |
| CN | 111055844 A | 4/2020 |
| DE | 102011085167 A1 | 4/2013 |
| KR | 20190017323 A | 2/2019 |

OTHER PUBLICATIONS

EPO, "Supplementary European Search Report for EP Application No. 20953766.1", Hague, Germany, Aug. 16, 2023.
Notification to Grant Patent Right for Invention issued in counterpart Chinese Patent Application No. 202080103723.8, dated Feb. 27, 2025.

* cited by examiner

DRIVING CONTROL METHOD FOR VEHICLE

CROSS-REFERENCE TO RELATED PATENT APPLICATION

This application is a U.S. national stage application of PCT Patent Application No. PCT/CN2020/116489 filed Sep. 21, 2020, which is incorporated herein in its entirety by reference.

FIELD OF THE INVENTION

The present invention relates to the field of vehicle driving technologies, and particularly to a driving control method for a vehicle.

BACKGROUND OF THE INVENTION

A rear wheel steering (RWS) function is a rear wheel steering angle control concept which is proposed to improve handling stability of a vehicle during high-speed traveling and improve maneuvering flexibility during low-speed traveling. A traffic jam pilot (TJP) function means that under a traffic jam road condition, a dynamic environment of the whole vehicle is collected by various sensors, radars, cameras, or the like, on the vehicle, a safe driving path is planned, and then, the vehicle is driven on the planned path by controlling a steering/braking/power actuator, so as to realize lateral and longitudinal automatic driving under the traffic jam road condition.

However, the traffic jam pilot function and the rear wheel steering function are controlled by two different electronic control units (ECUs), and there is no driving control method in the prior art for allowing the vehicle to safely incorporate the traffic jam pilot function and the rear wheel steering function at the same time.

BRIEF DESCRIPTION OF THE INVENTION

An object of the present invention is to provide a driving control method for a vehicle, so as to allow the vehicle to safely incorporate a traffic jam pilot function and a rear wheel steering function at the same time.

A further object of the present invention is to further improve a vehicle performance.

In particular, the present invention provides a driving control method for a vehicle, including:
  acquiring a state of a rear wheel steering function of the vehicle; and
  adjusting the state of the rear wheel steering function to control a traffic jam pilot function of the vehicle to enter an activated state;
  wherein if the rear wheel steering function is in an activated state, the traffic jam pilot function does not enter the activated state before the rear wheel steering function is switched to an inactivated state; and
  if the rear wheel steering function is in an inactivated state, the traffic jam pilot function enters the activated state after both a longitudinal control state and a lateral control state of the vehicle enter a traffic jam pilot mode.

Optionally, the vehicle includes an active safety domain master and a vehicle dynamics domain master, and the driving control method includes:
  receiving, by the active safety domain master, an input instruction for requesting activation of the traffic jam pilot function;
  sending, by the active safety domain master, an activation request of the traffic jam pilot function to the vehicle dynamics domain master in response to the input instruction; and
  determining, by the vehicle dynamics domain master, whether the rear wheel steering function is in the inactivated state in response to the activation request.

Optionally, the vehicle includes a rear assistant steering module, and the driving control method includes:
  if the rear wheel steering function is in the activated state, sending, by the vehicle dynamics domain master, an inactivation signal for exiting the rear wheel steering function to the rear assistant steering module, such that the rear wheel steering function enters the inactivated state; and
  if the rear wheel steering function is in the inactivated state, allowing the longitudinal control state to enter the traffic jam pilot mode, and feeding, by the vehicle dynamics domain master, back information that the longitudinal control state enters the traffic jam pilot mode to the active safety domain master.

Optionally, the driving control method further includes:
  when the rear wheel steering function is in the activated state, stopping, by the rear assistant steering module, execution of a steering angle control request of the rear wheel steering function in response to the inactivation signal, so as to cause the vehicle to exit the rear wheel steering function; and
  judging whether the rear wheel steering function is completely exited, if yes, allowing the rear wheel steering function to be in the inactivated state, and if no, sending, by the vehicle dynamics domain master, a longitudinal faulty signal that the longitudinal control state is a faulty state to the active safety domain master.

Optionally, the driving control method further includes:
  when the rear wheel steering function cannot be completely exited, changing, by the active safety domain master, the activation request into a no request mode in response to the longitudinal faulty signal, and allowing the traffic jam pilot function not to enter the activated state.

Optionally, the vehicle includes a power steering control module, and the driving control method further includes:
  sending, by the active safety domain master, the activation request to the power steering control module in response to the input instruction; and
  judging, by the power steering control module, whether a lateral controller of the vehicle is faulty in response to the activation request.

Optionally, if the lateral controller is faultless, the lateral control state enters the traffic jam pilot mode, and the power steering control module feeds back information that the lateral control state enters the traffic jam pilot mode to the active safety domain master; and
  if the lateral controller is faulty, the power steering control module sends a lateral faulty signal that the lateral control state is a faulty state to the active safety domain master.

Optionally, when the lateral controller is faulty, the active safety domain master changes the activation request into a no request mode in response to the lateral faulty signal, and the traffic jam pilot function does not enter the activated state.

Optionally, the vehicle includes an active safety domain master, a vehicle dynamics domain master, and a power steering control module, and the driving control method includes:

receiving, by the active safety domain master, information that the longitudinal control state enters the traffic jam pilot mode and information that the lateral control state enters the traffic jam pilot mode; and sending, by the active safety domain master, a global instruction that a global control state of the vehicle enters the traffic jam pilot mode to the vehicle dynamics domain master and the power steering control module;

wherein the information that the longitudinal control state enters the traffic jam pilot mode is provided by the vehicle dynamics domain master, and the information that the lateral control state enters the traffic jam pilot mode is provided by the power steering control module; and the global control state includes the longitudinal control state and the lateral control state.

Optionally, the driving control method further includes:

starting, by the vehicle dynamics domain master and the power steering control module, to execute braking and steering angle instructions in response to the global instruction, and allowing the traffic jam pilot function to enter the activated state.

Optionally, the driving control method further includes:

when the active safety domain master receives an exit instruction for requesting exit of the traffic jam pilot function, in response to the exit instruction, releasing, by the vehicle dynamics domain master, the inactivated state of the rear wheel steering function.

In the control method according to the present invention, when the traffic jam pilot function is required to be activated by the vehicle, the state of the rear wheel steering function is monitored and adjusted first, the rear wheel steering function is adjusted according to the activation requirement of the traffic jam pilot function, and priority of the traffic jam pilot function is higher than that of the rear wheel steering function, which avoids a conflict between the rear wheel steering function and the traffic jam pilot function, such that the vehicle can incorporate the rear wheel steering function and the traffic jam pilot function at the same time.

Further, in the control method according to the present invention, when the active safety domain master receives the exit instruction for requesting the exit of the traffic jam pilot function, the vehicle dynamics domain master releases the inactivated state of the rear wheel steering function in response to the exit instruction. Thus, after the traffic jam pilot mode is exited, the rear wheel steering function can be activated to improve the vehicle performance.

According to the following detailed description of specific embodiments of the present invention in conjunction with drawings, those skilled in the art will better understand the aforementioned and other objects, advantages and features of the present invention.

BRIEF DESCRIPTION OF THE DRAWINGS

Some specific embodiments of the present invention will be described below in detail in an exemplary rather than restrictive manner with reference to the drawings. Identical reference numerals in the drawings represent identical or similar components or parts. Those skilled in the art should understand that these drawings are not necessarily drawn to scale. In the drawings.

DETAILED DESCRIPTION

Figure 1:
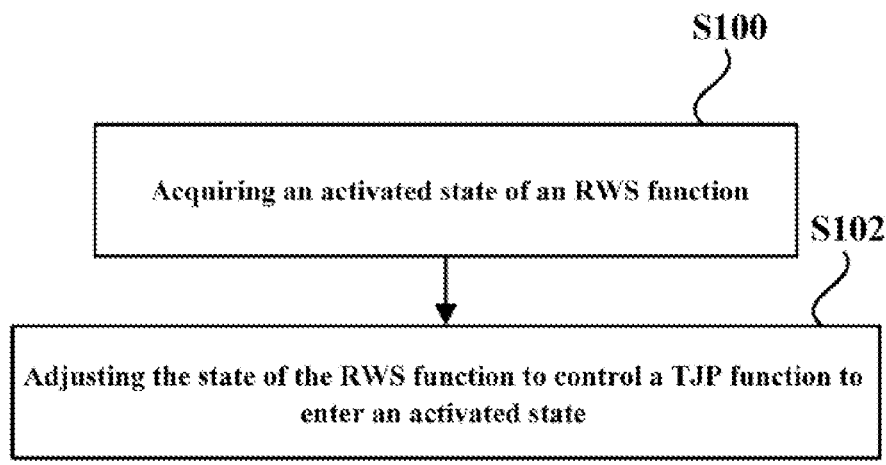
FIG. 1 is a schematic flow diagram of a driving control method according to an embodiment of the present invention.

FIG. 1 is a schematic flow diagram of a driving control method according to an embodiment of the present invention.

Referring to FIG. 1, the driving control method may generally include: step S100: acquiring a state of a rear wheel steering (RWS) function of a vehicle; and step S102: adjusting the state of the rear wheel steering function to control a traffic jam pilot (TJP) function of the vehicle to enter an activated state.

Further, step S102 may further specifically include that if the rear wheel steering function is in an activated state, before the rear wheel steering function is switched to an inactivated state, the traffic jam pilot function does not enter the activated state. If the rear wheel steering function is in an inactivated state, after both a longitudinal control state and a lateral control state of the vehicle enter a traffic jam pilot mode, the traffic jam pilot function enters the activated state.

In step S102, the adjusting the state of the rear wheel steering function may include: maintaining the inactivated state of the rear wheel steering function, and switching the activated state of the rear wheel steering function to the inactivated state.

That is, when the traffic jam pilot function is required to be activated, the state of the rear wheel steering function of the vehicle is first detected and acquired. When the state of the rear wheel steering function does not interfere with the traffic jam pilot function (that is, the rear wheel steering function is in the inactivated state), the inactivated state of the rear wheel steering function is maintained, and the traffic jam pilot function may be correspondingly controlled to enter the activated state. When the state of the rear wheel steering function may interfere with the traffic jam pilot function (that is, the rear wheel steering function is in the activated state), the activated state of the rear wheel steering function is required to be first switched to the inactivated state, and then, the traffic jam pilot function may be correspondingly controlled to enter the activated state.

The rear wheel steering function and the traffic jam pilot function of the vehicle can be controlled by corresponding electronic control units (ECUs) respectively. When the traffic jam pilot function is required to be activated, if the rear wheel steering function is in the activated state at the same time, a rear wheel steering angle may be controlled by a main electronic control unit of the rear wheel steering function at any time, which brings negative and uncontrollable influences to a path planning calculation in the traffic jam pilot function, thus influencing driving safety.

In the control method according to the present invention, when the traffic jam pilot function is required to be activated by the vehicle, the state of the rear wheel steering function is monitored and adjusted first, the rear wheel steering function is adjusted according to an activation requirement of the traffic jam pilot function, and priority of the traffic jam pilot function is higher than that of the rear wheel steering function, which avoids a conflict between the rear wheel steering function and the traffic jam pilot function, such that the vehicle can incorporate the rear wheel steering function and the traffic jam pilot function at the same time.

Figure 2:
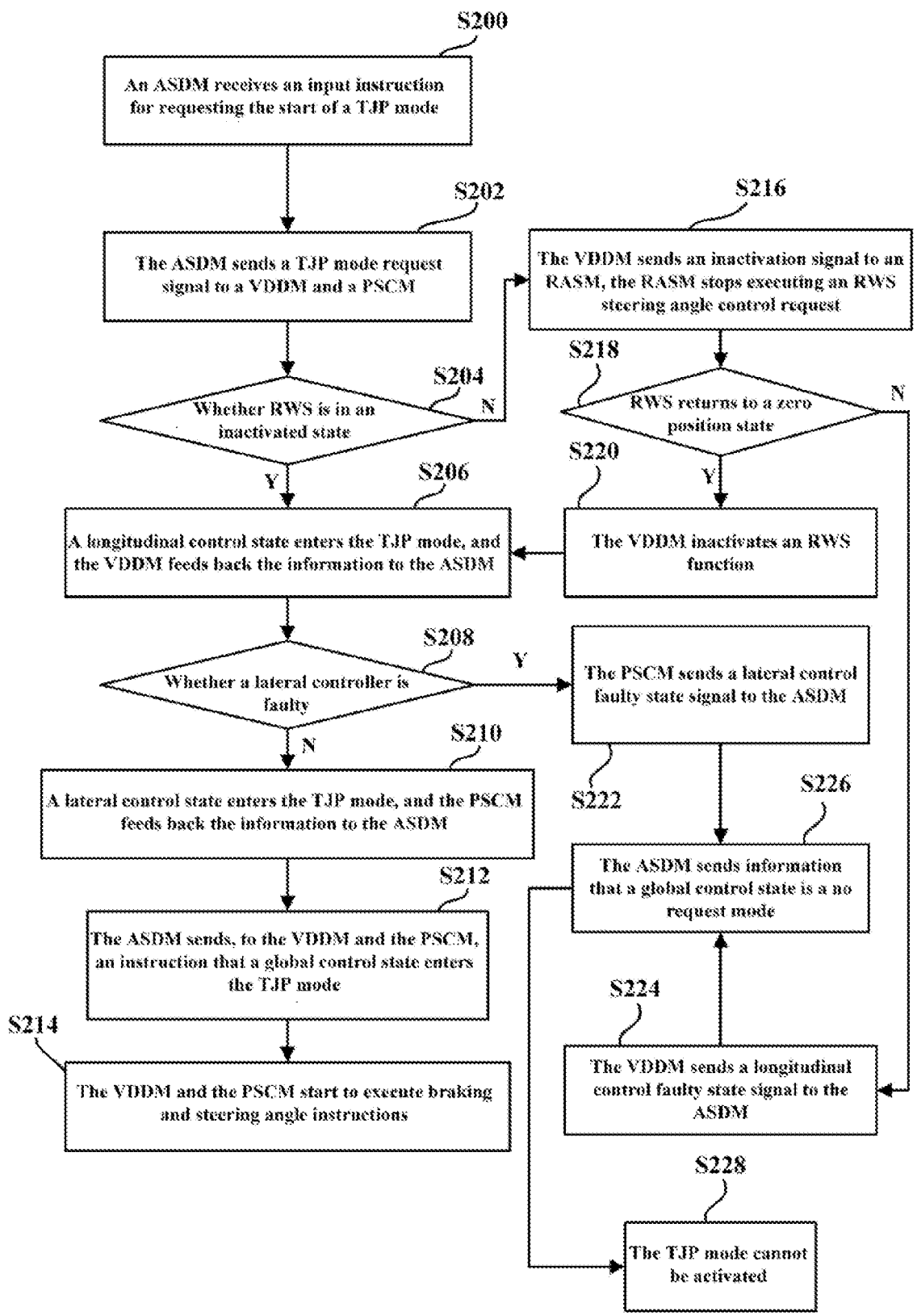
FIG. 2 is a schematic flow diagram of a driving control method according to another embodiment of the present invention.

FIG. 2 is a schematic flow diagram of a driving control method according to another embodiment of the present invention. The vehicle suitable for the present embodiment is equipped with an active safety domain master (ASDM), a power steering control module (PSCM), a vehicle dynamics domain master (VDDM), and a rear assistant steering module (RASM). The power steering control module can be a lateral controller of the vehicle and is configured to carry out electric power steering; the rear assistant steering module can be configured to execute the rear wheel steering function; the vehicle dynamics domain master can monitor the state of the rear wheel steering function, and furthermore, the vehicle dynamics domain master also includes a longitudinal controller of the vehicle which is configured to control starting, stopping, acceleration and deceleration of the vehicle; the active safety domain master can control the power steering control module, the vehicle dynamics domain master, the rear assistant steering module and other electronic control units of the vehicle in an overall planned mode according to the control method for a vehicle. Technologies for the above controllers and control modules to independently execute control operations are well known to those skilled in the art, and are not repeated herein.

Referring to FIG. 2, the driving control method according to the present embodiment may include:

step S200: the active safety domain master receives an input instruction for requesting activation of the traffic jam pilot function.

Step S202: the active safety domain master sends an activation request (request signal) of the traffic jam pilot function to the vehicle dynamics domain master in response to the input instruction.

It should be noted that step S202 may further include that the active safety domain master simultaneously sends the activation request (request signal) of the traffic jam pilot function to the power steering control module, so as to adjust the lateral controller of the vehicle (described in detail later).

Step S204: the vehicle dynamics domain master determines whether the rear wheel steering function is in an inactivated state in response to the activation request.

If a determination result at step S204 is yes (indicated by Y in FIG. 2), step S206 is executed.

Step S206: the rear wheel steering function is in an inactivated state, the longitudinal control state enters the traffic jam pilot mode, and the vehicle dynamics domain master feeds back information that the longitudinal control state enters the traffic jam pilot mode to the active safety domain master. The state of the longitudinal controller is the longitudinal control state.

If the determination result at step S204 is no (indicated by N in FIG. 2), step S216 is executed.

Step S216: the rear wheel steering function is in an activated state, and the vehicle dynamics domain master sends an inactivation signal for exiting the rear wheel steering function to the rear assistant steering module, such that the rear wheel steering function enters the inactivated state.

With continued reference to step S216, the driving control method may further specifically include that when the rear wheel steering function is in the activated state, the rear assistant steering module stops executing a steering angle control request of the rear wheel steering function in response to the inactivation signal, so as to cause the vehicle to exit the rear wheel steering function.

The process that the vehicle exits the rear wheel steering function is required to be performed step by step, and therefore, step S218 is required to be performed to judge whether rear wheel steering is returned to a zero position state. That is, whether the rear wheel steering function is completely exited is judged.

If yes, the rear wheel steering function is in (or successfully switched to) the inactivated state. That is, the vehicle dynamics domain master inactivates the rear wheel steering function corresponding to step S220.

If no, the rear wheel steering function cannot be switched to the inactivated state, and the vehicle dynamics domain master cannot inactivate the rear wheel steering function, and thus cannot continuously allow the longitudinal control state to enter the traffic jam pilot mode. At this point, corresponding to step 224, the vehicle dynamics domain master may send a longitudinal faulty signal that the longitudinal control state is a faulty state to the active safety domain master. Furthermore, when the longitudinal controller is detected to be faulty, the vehicle dynamics domain master also sends the longitudinal faulty signal that the longitudinal control state is a faulty state to the active safety domain master.

Further, the driving control method further includes:

step S226: when the rear wheel steering function cannot be completely exited, the active safety domain master changes the activation request into a no request mode in response to the longitudinal faulty signal. That is, the active safety domain master sends information that a global control state is the no request mode. The global control state includes the longitudinal control state.

Step S228: the traffic jam pilot function does not enter the activated state. That is, the traffic jam pilot mode cannot be activated.

Therefore, if the rear wheel steering function cannot be exited due to a fault, the traffic jam pilot mode cannot be activated, thus avoiding the conflict between the rear wheel steering function and the traffic jam pilot mode.

Further, referring to step S206 again, if the rear wheel steering function can be exited or is already in the inactivated state, step S208 may be continued to detect and adjust the lateral control state of the vehicle.

As mentioned above, the control method further includes that the active safety domain master sends the activation request to the power steering control module in response to the input instruction. This step may be incorporated into step S202 as shown in FIG. 2, or may be a separate step.

The step of detecting and adjusting the lateral control state of the vehicle may specifically include:

step S208: the power steering control module judges whether the lateral controller of the vehicle is faulty in response to the activation request.

If the lateral controller is faultless, step S210 is executed.

Step S210: the lateral control state enters the traffic jam pilot mode, and the power steering control module feeds back information that the lateral control state enters the traffic jam pilot mode to the active safety domain master.

At this point, referring to steps S206 to S210, after the longitudinal control state and the lateral control state of the vehicle both enter the traffic jam pilot mode, the traffic jam pilot function may be consequently controlled to enter the activated state (specific steps are described in detail later).

With continued reference to step S208, if the lateral controller is faulty, step S222 is executed.

Step S222: the power steering control module sends a lateral faulty signal that the lateral control state is a faulty state to the active safety domain master.

At this point, since the lateral controller is faulty, the lateral controller cannot make the lateral control state enter the traffic jam pilot mode. Correspondingly, step S226 and step S228 may be performed.

Step S226: the active safety domain master changes the activation request into a no request mode in response to the lateral faulty signal. That is, the active safety domain master sends the information that the global control state is the no request mode. The global control state further includes the lateral control state.

Step S228: the traffic jam pilot function does not enter the activated state.

Therefore, if the lateral controller sends a fault, the traffic jam pilot mode cannot be activated, thus avoiding that the traffic jam pilot function cannot be smoothly achieved.

Further, after the longitudinal control state and the lateral control state of the vehicle both enter the traffic jam pilot mode (see, for example, step S206 and step S210), specific steps for controlling the traffic jam pilot function to enter the activated state may include:

step S212: the active safety domain master sends a global instruction that the global control state of the vehicle enters the traffic jam pilot mode to the vehicle dynamics domain master and the power steering control module. As mentioned above, the global control state includes the longitudinal control state and the lateral control state.

Step S214: the vehicle dynamics domain master and the power steering control module start to execute braking and steering angle instructions in response to the global instruction, and the traffic jam pilot function enters the activated state.

That is, according to step S206 and step S210, the active safety domain master receives information that the longitudinal control state enters the traffic jam pilot mode and information that the lateral control state enters the traffic jam pilot mode. The information that the longitudinal control state enters the traffic jam pilot mode is provided by the vehicle dynamics domain master, and the information that the lateral control state enters the traffic jam pilot mode is provided by the power steering control module.

At this point, the active safety domain master is required to exchange and gather the information from two different controllers/control modules and return complete information to the two controllers/control modules, so as to control the longitudinal control state and the lateral control state of the vehicle in a unified manner, such that the traffic jam pilot function enters the activated state stably.

Figure 3:
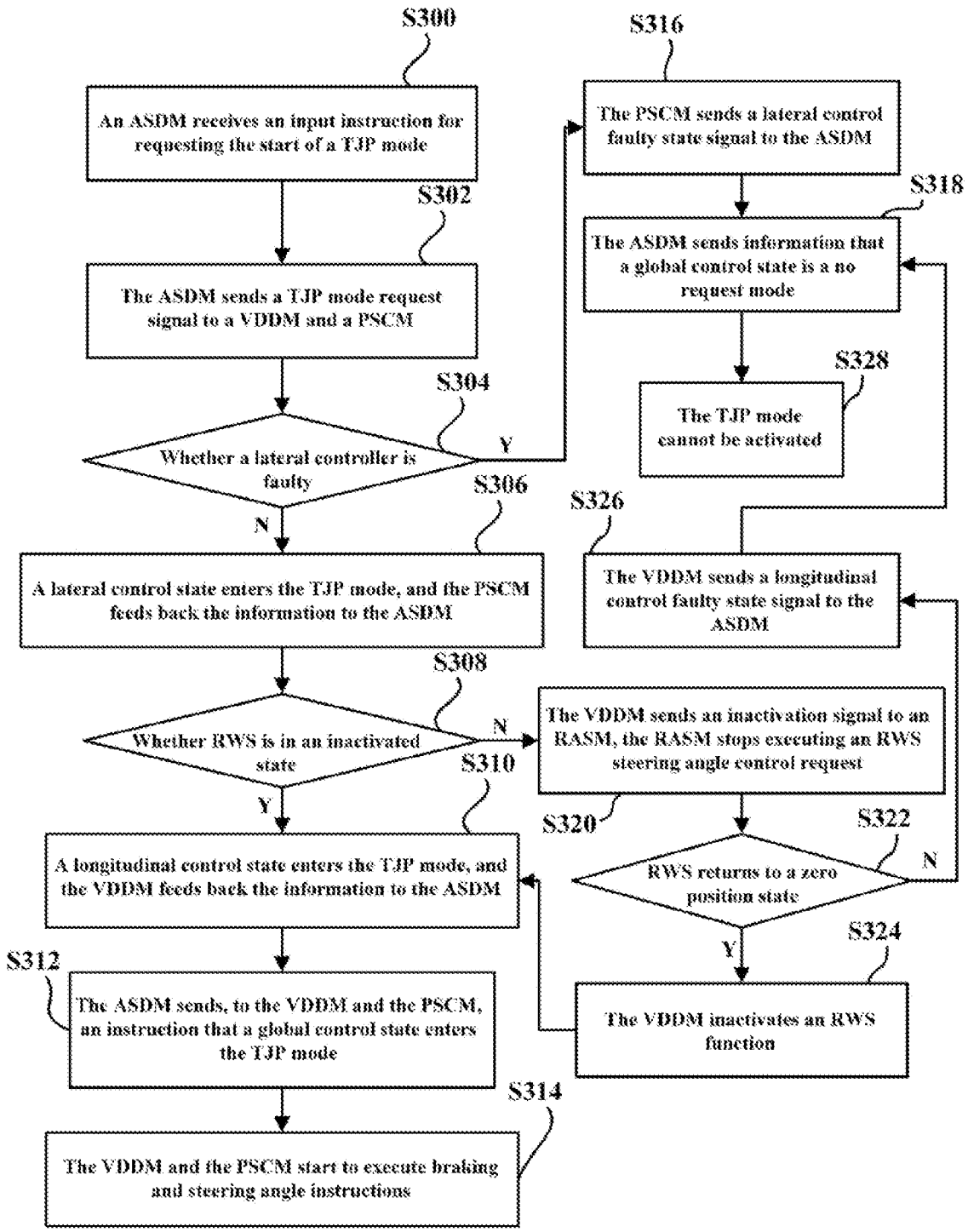
FIG. 3 is a schematic flow diagram of a driving control method according to still another embodiment of the present invention.

FIG. 3 is a schematic flow diagram of a driving control method according to still another embodiment of the present invention. The embodiment of FIG. 3 differs from the embodiment of FIG. 2 in that an order of the step of judging whether the lateral controller is faulty and the step of judging whether the rear wheel steering function is in an inactivated state is reversed.

It should be noted that, in the control method according to the present invention, the detection and judgment of whether the lateral controller is faulty and the detection and judgment of whether the rear wheel steering function is in the inactivated state may be performed simultaneously, and there is no requirement for the execution order of the two judgment steps.

As can be seen from FIGS. 2 and 3, steps S00 to S302 may correspond to steps S200 to S202, steps S304 to S306 may correspond to steps S208 to S210, steps S308 to S310 may correspond to steps S204 to S206, steps S312 to S314 may correspond to steps S212 to S214, steps S316 to S328 may correspond to steps S222 to S228, and steps S320 to S324 and S326 may correspond to steps S216 to S220 and S224. Therefore, for the description of the embodiment in FIG. 3, reference may be made to the description of the embodiment in FIG. 2, and details are not repeated here.

According to FIGS. 1 to 3 and the corresponding foregoing description, with the control method according to the present invention, the vehicle may incorporate the rear wheel steering function and the traffic jam pilot function at the same time, and when the two functions affect each other and conflict, the dynamics domain master can uniformly arbitrate and control starting and stopping of the rear wheel steering function, such that the traffic jam pilot function is not affected by the rear wheel steering function.

Figure 4:
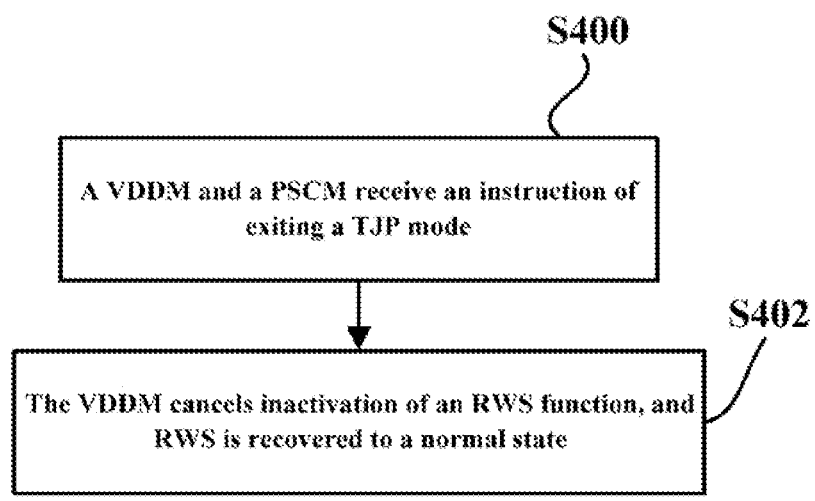
FIG. 4 is a schematic flow diagram of a driving control method according to an embodiment of the present invention, which shows a control method for exiting a traffic jam pilot function.

FIG. 4 is a schematic flow diagram of a driving control method according to an embodiment of the present invention, which shows a control method for exiting the traffic jam pilot function.

Referring to FIG. 4, the control method for exiting the traffic jam pilot function may include:

step S400, the vehicle dynamics domain master and the power steering control module receive an instruction of exiting the traffic jam pilot mode.

Step S402: the vehicle dynamics domain master cancels inactivation of the rear wheel steering function, the rear wheel steering function is recovered to a normal state, and the rear wheel steering function can be controlled to be activated again.

That is, when the active safety domain master receives an exit instruction for requesting the exit of the traffic jam pilot function, the vehicle dynamics domain master releases the inactivated state of the rear wheel steering function in response to the exit instruction. Thus, after the traffic jam pilot mode is exited, the rear wheel steering function can be activated to improve the vehicle performance.

So far, those skilled in the art should be aware that, although plural exemplary embodiments of the present invention have been shown and described herein in detail, a lot of other variations or modifications conforming to the principle of the present invention can still be directly determined or derived from the contents disclosed in the present invention without departing from the spirit and scope of the present invention. Therefore, the scope of the present invention should be understood and deemed as covering all of these other variations or modifications.

What is claimed is:

1. A driving control method for a vehicle, comprising:
   acquiring a state of a rear wheel steering function of the vehicle; and
   adjusting the state of the rear wheel steering function, and controlling a traffic jam pilot function of the vehicle to enter an activated state;
   wherein in response to that the rear wheel steering function is in an activated state, the traffic jam pilot function does not enter the activated state before the rear wheel steering function is switched to an inactivated state; and
   in response to that the rear wheel steering function is in an inactivated state, the traffic jam pilot function enters the activated state after both a longitudinal control state and a lateral control state of the vehicle enter a traffic jam pilot mode;

wherein the vehicle comprises an active safety domain master and a vehicle dynamics domain master, and the driving control method comprises:

receiving, by the active safety domain master, an input instruction configured for requesting activation of the traffic jam pilot function;

sending, by the active safety domain master, an activation request of the traffic jam pilot function to the vehicle dynamics domain master in response to the input instruction; and determining, by the vehicle dynamics domain master, whether the rear wheel steering function is in the inactivated state in response to the activation request; and wherein the adjusting the state of the rear wheel steering function comprises: maintaining the inactivated state of the rear wheel steering function, and switching the activated state of the rear wheel steering function to the inactivated state.

2. The driving control method according to claim 1, wherein the vehicle comprises a rear assistant steering module, and the driving control method comprises:

in response to that the rear wheel steering function is in the activated state, sending, by the vehicle dynamics domain master, an inactivation signal configured for exiting the rear wheel steering function to the rear assistant steering module, such that the rear wheel steering function enters the inactivated state; and in response to that the rear wheel steering function is in the inactivated state, allowing the longitudinal control state to enter the traffic jam pilot mode, and feeding, by the vehicle dynamics domain master, back information that the longitudinal control state enters the traffic jam pilot mode to the active safety domain master.

3. The driving control method according to claim 2, further comprising:

in response to that the rear wheel steering function is in the activated state, stopping, by the rear assistant steering module, execution of a steering angle control request of the rear wheel steering function in response to the inactivation signal, so as to cause the vehicle to exit the rear wheel steering function; and judging whether the rear wheel steering function is completely exited, in response to that the rear wheel steering function is completely exited, allowing the rear wheel steering function to be in the inactivated state, and in response to that the rear wheel steering function is not completely exited, sending, by the vehicle dynamics domain master, a longitudinal faulty signal that the longitudinal control state is a faulty state to the active safety domain master.

4. The driving control method according to claim 3, further comprising:

in response to that the rear wheel steering function cannot be completely exited, changing, by the active safety domain master, the activation request into a no request mode in response to the longitudinal faulty signal, and allowing the traffic jam pilot function not to enter the activated state.

5. The driving control method according to claim 1, wherein the vehicle comprises a power steering control module, and the driving control method further comprises:

sending, by the active safety domain master, the activation request to the power steering control module in response to the input instruction; and judging, by the power steering control module, whether a lateral controller of the vehicle is faulty in response to the activation request.

6. The driving control method according to claim 5, wherein in response to that the lateral controller is faultless, the lateral control state enters the traffic jam pilot mode, and the power steering control module is configured to feed back information that the lateral control state enters the traffic jam pilot mode to the active safety domain master; and in response to that the lateral controller is faulty, the power steering control module sends a lateral faulty signal that the lateral control state is a faulty state to the active safety domain master.

7. The driving control method according to claim 6, wherein in response to that the lateral controller is faulty, the active safety domain master changes the activation request into a no request mode in response to the lateral faulty signal, and the traffic jam pilot function does not enter the activated state.

8. The driving control method according to claim 1, wherein the vehicle comprises an active safety domain master, a vehicle dynamics domain master, and a power steering control module, and the driving control method comprises:

receiving, by the active safety domain master, information that the longitudinal control state enters the traffic jam pilot mode and information that the lateral control state enters the traffic jam pilot mode; and sending, by the active safety domain master, a global instruction that a global control state of the vehicle enters the traffic jam pilot mode to the vehicle dynamics domain master and the power steering control module; wherein the information that the longitudinal control state enters the traffic jam pilot mode is provided by the vehicle dynamics domain master, and the information that the lateral control state enters the traffic jam pilot mode is provided by the power steering control module; and the global control state comprises the longitudinal control state and the lateral control state.

9. The driving control method according to claim 8, further comprising:

starting, by the vehicle dynamics domain master and the power steering control module, executing braking and steering angle instructions in response to the global instruction, and allowing the traffic jam pilot function to enter the activated state.

10. The driving control method according to claim 9, further comprising:

in response to that the active safety domain master receives an exit instruction configured for requesting exit of the traffic jam pilot function, in response to the exit instruction, releasing, by the vehicle dynamics domain master, the inactivated state of the rear wheel steering function.

* * * * *